United States Patent

[11] 3,585,494

| [72] | Inventors | Donald A. Bozanic;<br>Dickron Mergerian, Baltimore; Ronald W. Minarik, Lutherville, all of, Md. |
|---|---|---|
| [21] | Appl. No. | 832,100 |
| [22] | Filed | June 11, 1969 |
| [45] | Patented | June 15, 1971 |
| [73] | Assignee | Westinghouse Electric Corporation<br>Pittsburgh, Pa. |

[54] ELECTRON SPIN ECHO SYSTEM HAVING A PULSED PREPARATION MAGNETIC FIELD APPLIED TO THE SAMPLE
10 Claims, 5 Drawing Figs.

| [52] | U.S. Cl. | 324/0.5, 340/173 |
|---|---|---|
| [51] | Int. Cl. | G01n 27/78 |
| [50] | Field of Search | 324/0.5; 340/173 |

[56] References Cited
UNITED STATES PATENTS

| 2,700,147 | 1/1955 | Tucker | 340/173 |
|---|---|---|---|
| 3,275,931 | 9/1966 | Collins | 324/0.5 |

*Primary Examiner*—Michael J. Lynch
*Attorneys*—F. H. Henson, E.P. Klipfel and J. L. Wiegreffe

ABSTRACT: Method and apparatus for achieving adiabatic demagnetization of an electron spin echo sample for enhancing the dynamic range and operable repetition rate of electron spin echoes by applying a "preparation" pulsed magnetic field of a predetermined field strength and direction to the sample located in a resonant cavity prior to the application of a pair of successive microwave pulses orthogonally to a relatively smaller static, unidirectional magnetic field so that a spin echo signal is produced before thermal equilibrium of the sample is reached. The static magnetic field is established either after or concurrently with the pulsed magnetic field and in the same direction.

3,585,494

INVENTORS
DONALD A. BOZANIC
DICKRON MERGERIAN
RONALD W. MINARIK

BY Ernest S. Kigbil

ATTORNEY

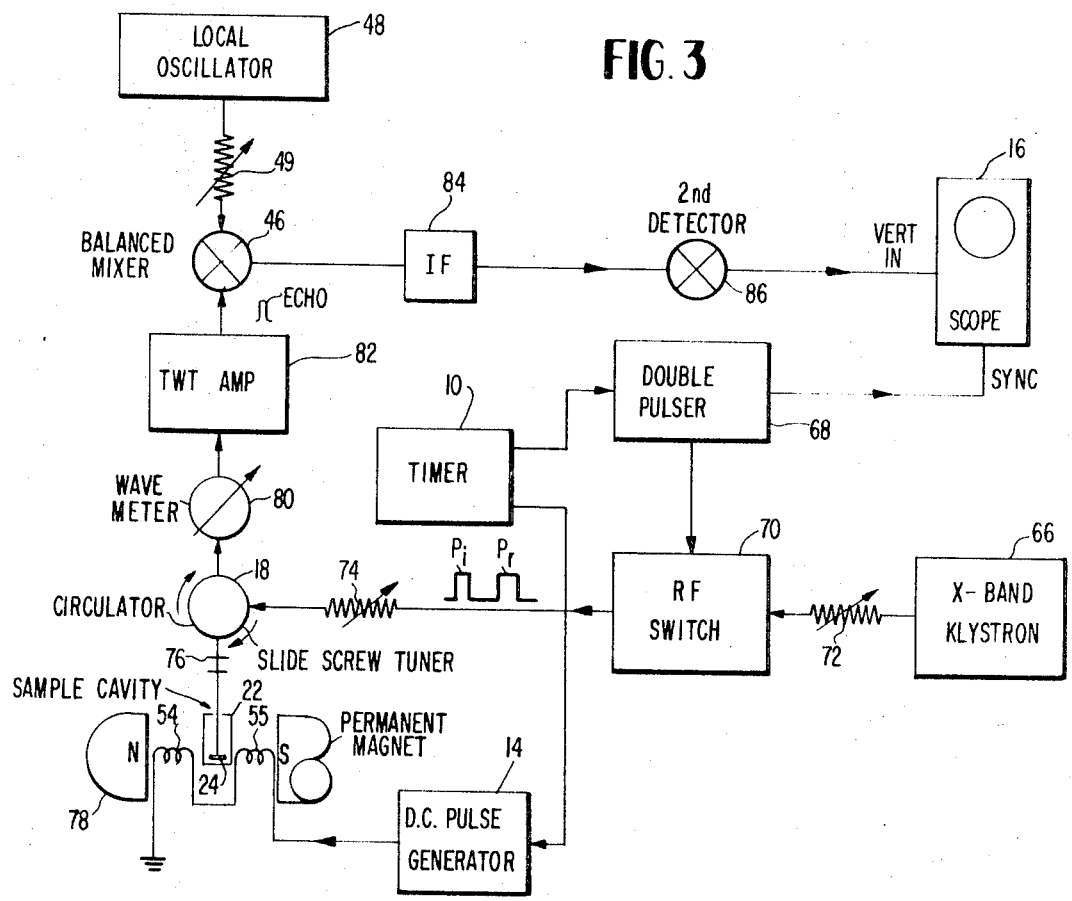
FIG. 3
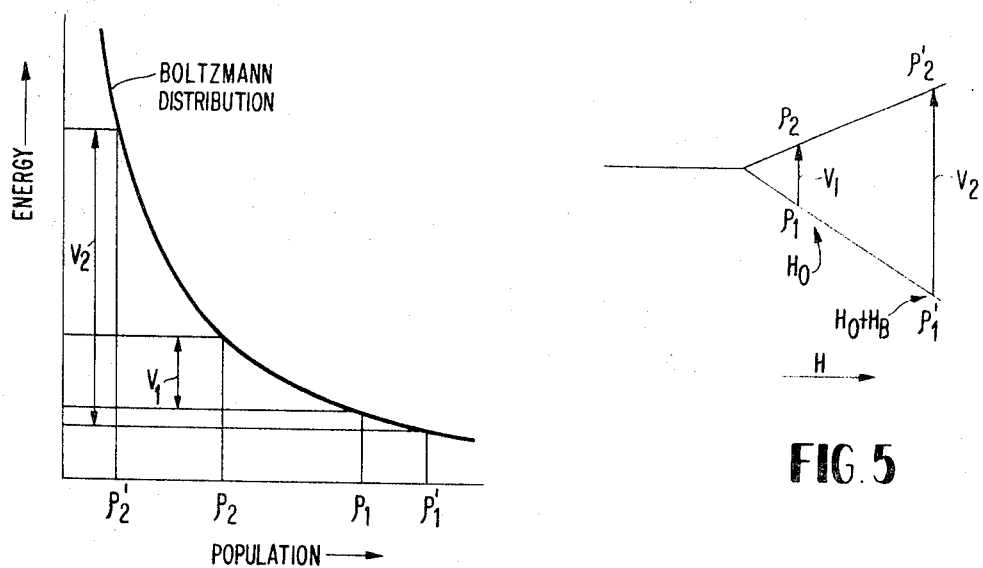
FIG. 4
FIG. 5

ELECTRON SPIN ECHO SYSTEM HAVING A PULSED PREPARATION MAGNETIC FIELD APPLIED TO THE SAMPLE

BACKGROUND OF THE INVENTION

1. Field of the Invention

The subject invention is directed to a method and apparatus for increasing the dynamic range and repetition rate of an electron spin echo system wherein successive microwave pulses separated by a time interval T are fed into a resonant cavity having a paramagnetic spin echo sample located therein and situated between a DC magnetic field to establish a state of thermal equilibrium with a predetermined magnetization wherein the electron spins have a population difference between a lower energy state and a higher energy state.

In a typical system, the spin echo sample may be for example a piece of crystalline quartz which is placed in a resonant cavity and is located within a strong uniform magnetic field for a sufficient period of time so as to be in thermal equilibrium, that is, the resultant magnetic moment present in the material is aligned in the direction of the field. If an RF field or "information" pulse having a frequency equal to the characteristic or Larmor frequency of the sample is now applied at right angles to the magnetic field, a torque is applied to the moment which causes it to be turned away from the direction of the field. The angle of tipping, that is, the angle between the moment and the direction of the field is proportional to the magnitude of the field and the time during which the RF field exists. Upon release of the displacing force, the spinning electrons urged again toward realignment by the force of the field rotate or precess about the field in much the same manner as a tipped gyroscope. The sample is then subjected to another RF field or "recollection" pulse also directed normal to the magnetic field. After a quiescent period, the sample spontaneously develops a magnetic field of its own which is also normal to the field and which rotates around the latter's direction. The strength of this rotating field builds up to a maximum and then decays which is then picked up and detected as an electrical pulse called a "spin echo" signal.

Pulsed nuclear induction spin echo methods and apparatus are well known to those skilled in the art. An example of such a teaching is found in U.S. Pat. No. 2,887,673, issued to E. L. Hahn. The difference between electron and nuclear spin systems is the difference in the operating frequencies encountered. This is attributed to the smaller mass of the electron in comparison to the proton in the nucleus. This difference gives an electron spin a larger magnetic moment in the order of 10—20 emu as compared to 1.5×10—23 emu for a spinning proton. Accordingly, the precessional frequency of the spinning electron is on the order of 2.8 MHz. per oersted as compared to 4.3 kHz. per oersted for the proton. Therefore, the speed of response of an electron spin system to an opposed RF magnetic field pulse may be as high as $10^3$ times faster than a proton based system.

The precessional or Larmor frequencies of electrons lie in the microwave range. Therefore, suitable microwave apparatus for applying a tipping field at the same microwave frequency as the Larmor frequency of the sample is required in systems based upon electron spin echoes. In general, such a requirement is satisfied by the proper design and construction of microwave resonators in which the spin sample is contained and in which input RF pulses are applied and output spin echo pulses obtained.

2. Description of the Prior Art

Spin echo systems have been employed not only for storage or memory apparatus, but also have been utilized in well logging apparatus for analyzing the material encountered in a well bore. An example of the former is U.S. Pat. No. 2,759,170 issued to A. G. Anderson et al., which discloses a nuclear spin system wherein an RF "pre-pulse" is applied prior to subsequent information pulses which then appear as "stimulated" echoes after the "recollection" pulse is applied. Many variations of this type of system including pulsing of the magnetic field after the application of the "pre-pulse" is applied is also known. Examples are U.S. Pat. No. 2,775,359, A. G. Anderson et al. and U.S. Pat. No. 2,780,798, A. G. Anderson. One example of a well logging system is taught by U.S. Pat. No. 3,226,632 issued to R. J. S. Brown et al., which discloses the procedure of first obtaining a polarization of the protons present in oil and water in the soil formation by means of polarizing magnetic field produced by an electrical coil system within the well bore. Current flow in the coil producing the polarization is cut off to reduce the applied magnetic field and then the spin echo signals induced within the well bore are observed by the precession of polarized protons occurring in the earth's magnetic field which is oriented perpendicular to the previously applied polarizing field. The polarizing field and the later applied refocusing pulse are comparable to 90° and 180° RF signals applied in other spin echo systems.

Although the above-noted spin echo systems function as intended, the present invention is directed to the method and means for increasing the gain of the echo signal by changing the population difference of the electrons contained in the atoms by "pre-cooling" the sample prior to the application of two RF microwave input pulses.

SUMMARY

Briefly, the inventive concept is directed to the improvement in the spin echo signal output of the spin echo system by applying a momentary magnetic field of a relatively large amplitude in comparison to a later or concurrently applied static DC magnetic field along the same or aiding field direction through the sample prior to the application of the microwave pulses thereto.

The larger magnetic field momentarily causes the population difference to increase beyond that which is normally produced by the static magnetic field alone. The larger momentary field is removed and the microwave pulses are applied in a time which is short relative to the relaxation time back to a population difference determined by the magnitude of the static magnetic field whereby the larger population difference is maintained so that the subsequent application of the microwave energy pulses produces an echo signal of a relatively higher output amplitude than one which would be obtained in absence of the prepulsed magnetic field. It is also known that under many conditions the spin-lattice relaxation time is proportional to the magnetic field applied. Therefore, the application of the pulsed magnetic field which may be called a "preparation field" returns the spins to equilibrium in a quicker time resulting in higher feasible repetition rates for the application of the two microwave pulses.

BRIEF DESCRIPTION OF THE DRAWINGS

FIG. 3 is a block diagram of a second embodiment of apparatus for practicing the subject invention;

FIG. 4 is a graphical representation of the Boltzmann distribution of the population difference in the electron spins of the present invention; and FIG. 5 is a diagram illustrative of the Zeeman aplitting of the population difference under the influence of the magnetic fields utilized by the subject invention.

DESCRIPTION OF THE PREFERRED EMBODIMENTS

Figure 1:
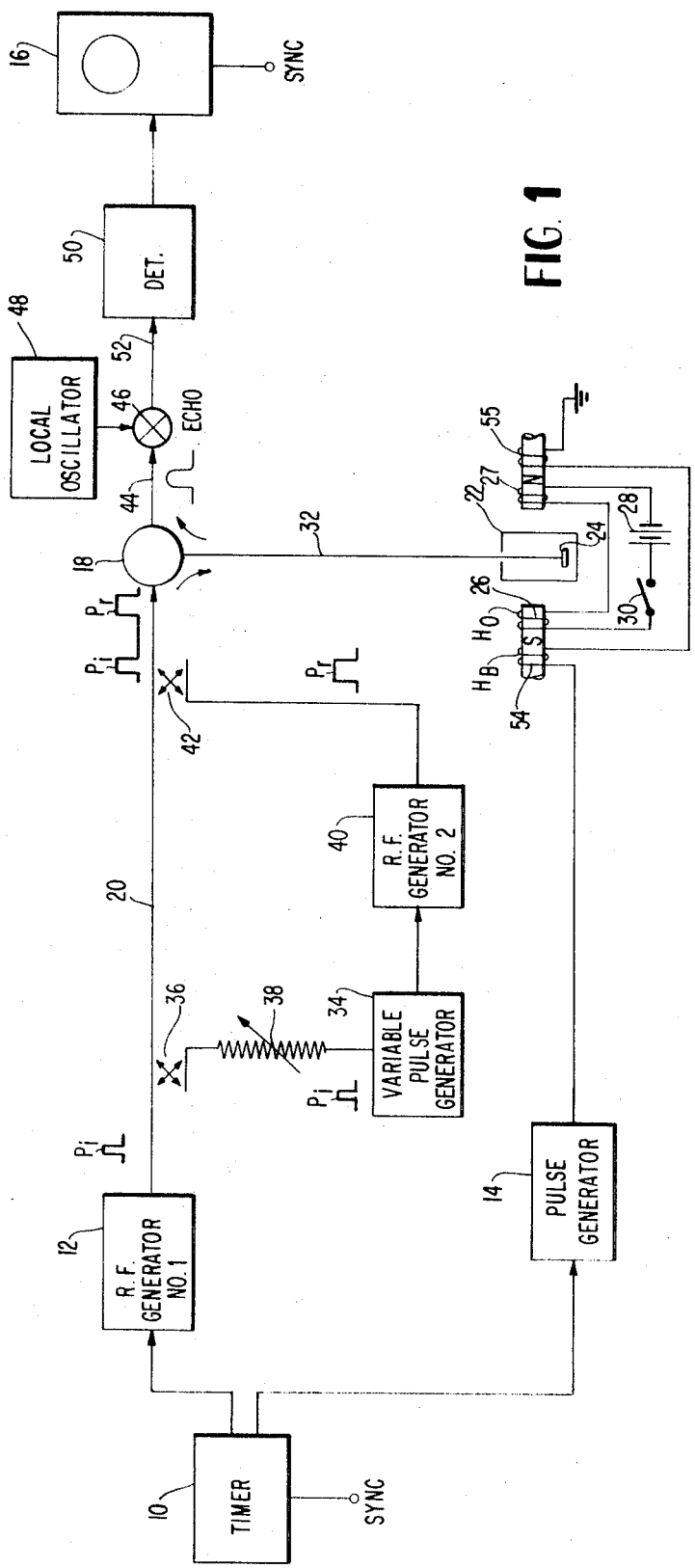
FIG. 1 is a block diagram of a first embodiment of apparatus for practicing the subject invention.

Referring now to the drawings wherein like numbers refer to like part, attention is directed to FIG. 1 which illustrates a first embodiment of the subject invention. This embodiment is comprised of a timer circuit or synchronizer 10 for operating the apparatus disclosed in a predetermined timed relationship. The timer 10 is shown coupled to a first RF generator 12 which comprises a microwave frequency pulse source which may be, for example, a magnetron or a klystron. The timer 10 additionally couples a timing signal to a pulse generator 14 as well as a synchronizing signal to an indicator 16, which may be, for example, an oscilloscope or the like.

The output of the RF generator 12 comprises the first of two successive microwave pulses required for electron spin echo generation and is referred to hereinafter as the $P_i$ pulse. This pulse is equivalent to and is often referred to as the 90° pulse in a nuclear spin echo system. The $P_i$ pulse is fed to a circulator 18 by means of a first waveguide path 20. The circulator 18 feeds the $P_i$ pulse into a resonator cavity 22 which is designed to have a resonant frequency corresponding to the Larmor frequency of a spin echo sample 24 located therein and situated within a fixed magnetic field $H_o$ established at right angles to the application of pulse $P_i$ by means of the DC electromagnet provided by the coils 26 and 27 coupled to a DC battery source 28 through a switch 30. The pulse $P_i$ is coupled from the circulator 18 into the waveguide cavity 22 by means of the waveguide member 32.

A portion of the pulse $P_i$ is coupled from the waveguide 20 to a variable pulse generator 34 by means of the waveguide coupler 36 and the variable attenuator 38. The variable pulse generator 34 is coupled to a second RF generator 40, which generates a second microwave pulse designated $P_r$ after a predetermined time interval T which is determined by the variable pulse generator 34. The pulse $P_r$ constitutes the second of two microwave pulses necessary to produce a spin echo and is equivalent to the RF pulse generally referred to as the 180° pulse in a nuclear spin system. The $P_r$ pulse is coupled back to the waveguide member 20 by means of the coupler 42 where it is then transmitted to the waveguide cavity 22 through the circulator 18 and the waveguide 32.

It is well known to those skilled in the art that the first microwave pulse $P_i$ tips the magnetization of the sample away from the direction of the magnetic field $H_o$ causing the spin orientation of the electron to precess like an infinitesimal gyroscope. When the sample is subjected to the second or $P_r$ pulse the spins are flipped over 180°. After a quiescent period equal in time to the time interval T between the pulses $P_i$ and $P_r$ the sample develops a magnetic moment of its own normal to the field $H_o$ called the "spin echo" signal. This spin echo signal then is coupled into the waveguide 32 through the circulator 18 and into the waveguide member 44 where it is fed into a mixer 46 which receives a heterodyning signal from a local oscillator 48. The output of the mixer 46 comprises an IF signal which is then coupled to a detector 50 by means of suitable circuit means 52. The output of the detector comprises a video signal suitable for viewing by means of the indicator 16.

In addition to the apparatus referred to above, the present invention contemplates the inclusion of means for providing a momentary magnetic field $H_b$ of a relatively larger magnitude than the fixed magnitude of $H_o$ per se and in the same direction through the sample 24 prior to the application of the microwave pulses $P_i$ and $P_r$ to the sample. This is accomplished by means of the additional windings 54 and 55 coupled in series to a pulse generator 14 which is controlled by the timer 10.

Figure 2:
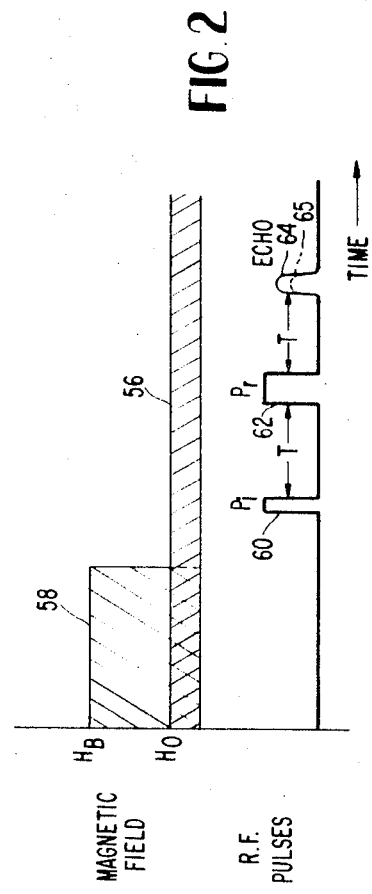
FIG. 2 is a timing diagram of waveforms illustrative of the operation of the subject invention.

This sequence of events is illustrated by the timing diagrams shown in FIG. 2 wherein the static DC magnetic field $H_o$ is illustrated by the waveform 56 while the momentary or pulsed "preparation" magnetic field $H_b$ is illustrated by the waveforms 58. The two microwave pulses $P_i$ and $P_r$ are illustrated by the waveforms 60 and 62 respectively, with the echo signal being designated by reference numeral 64. Reference numeral 65 is illustrative of an echo signal produced in absence of the pulsed magnetic field represented by waveform 58.

Before proceeding to a discussion of the principles underlying the use of the pulsed magnetic "preparation" field $H_b$ prior to the application of the pulses $P_i$ and $P_r$, attention is directed to FIG. 3 which is illustrative of a second embodiment of apparatus suitable for practicing the subject invention. The embodiment shown in FIG. 3 utilizes a CW klystron 66 operable in the X-band range of microwave frequencies and which is used as the source both for the $P_i$ and $P_r$ pulse by means of a double pulser circuit 68 which generates a pair of gates separated by time interval T and which are applied to an RF switch 70 when a signal is received from the timer circuit 10. The double pulser circuit 68 actuates the RF switch 70 in accordance with two gates from the double pulser 68 to couple a pair of microwave pulses from the klystron 66 and designated $P_i$ and $P_r$ to the circulator 18. Variable attenuators 72 and 74 are coupled in the line between the klystron 66, the RF switch 70 and the circulator 18 for providing the proper signal levels of energy transmitted to the circulator. A microwave slide-screw tuner 76 is coupled between the circulator 18 and the resonant cavity 22 which is located between a permanent magnet 78 and the electromagnet coils 54 and 55. These coils are likewise energized from the pulse generator 14 which is coupled back to the timer 10, in the same manner as the embodiment shown in FIG. 1. The pulse generator 14 applies a current pulse into the windings 54 and 55 prior to the application of the microwave pulses $P_i$ and $P_r$ and giving rise to the "preparation" magnetic field $H_b$ 58 shown in FIG. 2. The spin echo signal generated by the pulses $P_i$ and $P_r$ are coupled out of the circulator 18 through a wave-meter 80 and into a low level traveling-wave tube 82 which acts as an amplifier for the spin echo signal. The output of the traveling-wave tube 82 is coupled into a balanced mixer 46 which also receives an input from a local oscillator 48 through the variable attenuator 49. The resulting output from the mixer 46 comprises an IF signal which is coupled to an IF strip 84 and then to a second detector 86. The output of the second detector then is coupled into the indicator device 16 which has been noted to be an oscilloscope or other desired means for displaying waveforms.

As noted earlier the inventive concept of the present invention is directed to the application of the "preparation" magnetic field prior to application of the successive microwave pulses $P_i$ and $P_r$ which results in increasing the dynamic range of a system which is defined as the ratio of the largest obtainable echo signal compared to the minimum detectable echo signal as well as increasing the spin-lattice relaxation rate for operating the system at a relatively higher repetition rate. The explanation for this increase in echo signal output can be obtained by considering the energy levels present in the system. For a paramagnetic sample, for example, crystalline quartz, having a total spin of one-half, the operating or Larmor frequency can be expressed by the equation:

$$h\nu = g\beta H \quad (1)$$

where $h$ is Plank's constant, $\nu$ is the Larmor or operating frequency, $g$ is the spectroscopic splitting factor, $\beta$ is the Bohr magnetron, and $H$ is the applied magnetic field.

When the magnetic field $H_o$ is applied, the electron spins which were previously oriented in a random fashion have a tendency to align themselves with or against the magnetic field $H_o$ and in the process split into two energy states wherein the lower states are inherently more populated than the upper states. Considering a two level system which is sufficient to explain the operation of the subject invention wherein $\rho_1$ represents the lower energy state and those spins which have an orientation with the field $H_o$ while $\rho_2$ is representative of the higher energy state and those spins which are oriented against the field $H_o$, the respective numbers of spins in the upper state $\rho_2$ is related to the number of spins in the lower state $\rho_1$ by the following equation:

$$\rho_2 = \rho_1 e^{(h\nu/KT)} \quad (2)$$

where $e$ is the base of Napierian logarithms, $h$ is Plank's constant, $\nu$ is the operating or Larmor frequency, K is the Boltzmann constant and T is the temperature. This expression is illustrated by the curve 88 shown in FIG. 4 and denotes that the state $\rho_1$ has a higher population and lower energy level than the state $\rho_1$. It should also be pointed out that the RF power contained in the spin echo signal varies in proportion to the population difference of the sample before the two RF input pulses are applied in order to produce an echo. Mathematically this can be stated as:

$$P_{echo} \propto (\rho 1 - \rho 2)_{Boltzmann} \quad (3)$$

Referring now briefly to FIG. 5, the Zeeman splitting of the energy states is disclosed indicating that the population difference increases with increasing magnetic field applied to the sample. Without any magnetic field, no splitting occurs; however, with the application of the field $H_o$ the population $\rho_1$ and $\rho_2$ occur at a Larmor frequency of $\nu_1$. With the application of the additional magnetic field of $H_b$ the population difference increases to $\rho'_1$, and $\rho'_2$, and the Larmor frequency increases to $\nu_2$. If then the magnetic field $H_b$ is applied momentarily and removed, and if the pulses $P_i$ and $P_r$ are applied to the spin sample in a time which is short relative to the spin-lattice relaxation time back to $\rho_1$ and $\rho_2$ a power increase results in the spin echo signal. This is further illustrated by reference to FIG. 4 wherein the application of the "preparation" pulse $H_b$ results in the populations of $\rho'_1$ and $\rho'_2$. The increase in dynamic range can then be expressed as $\rho'_1-\rho'_2/\rho_1-\rho_2$. This phenomenon further is the result of adiabatic demagnetization, i.e. after the removal of the "preparation" pulse $H_b$ the sample will again be subject to the static magnetic field $H_o$ but energy transfer has occurred during the process to the system.

In addition to the increased dynamic range of the spin echo system by the application of a "preparation" magnetic field pulse $H_b$ in addition to the static magnetic field $H_o$ a second resultant effect is obtained thereby. For example, consider the situation where the spin-lattice time of the paramagnetic sample is relatively long, e.g., one second. From the prior discussion, it is evident that before a second echo of the same amplitude can be produced a waiting period in the order of 1 second must be observed. However the spin-lattice relaxation time has been found to be dependent upon the magnetic field H for a "direct-phonon" process according to the following expression:

$$\frac{1}{T_{s1}} \alpha H_4 \quad (4)$$

where $T_{s1}$ is the spin-lattice relaxation time. Since the relaxation rate is proportional to the fourth power of the magnetic field, the pulsed magnetic field spin will relax to equilibrium at a much faster rate and one need not wait nearly as long before applying a second set of microwave pulses. For example, with a 10 kilogauss pulsed field and a direct spin-lattice process in effect, the spins will return to equilibrium approximately 250 times as fast as an unpulsed system. This makes it possible to produce a spin echo every several milliseconds which can provide an invaluable tool where high repetition rates are required, such as radar.

What has been shown and described therefore, is an improved electronic spin echo system which utilizes the phenomenon of adiabatic demagnetization to provide enhancement of the dynamic range of the spin echo signal and increased repetition rates.

The foregoing detailed description of the subject invention is not meant to be considered in a limiting sense as it is desired that all equivalents, alterations and modifications coming within the spirit and scope of the following claims is herein meant to be included.

We claim as our invention:

1. An electron spin echo system comprising in combination:
   RF generator means for generating a first and a second pulse of RF energy separated by a predetermined time interval;
   a resonant cavity;
   a paramagnetic spin echo sample located in said cavity;
   circuit means coupling said RF generator means to said cavity for generating a spin echo signal when said first and said second pulse of RF energy are applied to said sample;
   means for generating a static unidirectional magnetic field through said spin echo sample at least while applying said first and said second RF pulse and generating said spin echo signal, said static magnetic field being directed through said sample substantially transverse to the direction of the application of said first and second RF pulse; and
   preparation means for generating a unidirectional magnetic field of a predetermined strength and duration in the same direction as said static magnetic field through said echo sample prior to the application of said first and said second RF pulse, said first and second RF pulses being applied in a time which is short relative to the spin-lattice relaxation time of the spin echo sample resulting from the discontinuance of the magnetic field generated by said preparation means.

2. The invention as defined by claim 1 wherein said RF generator means comprises means for producing a first and a second pulse of microwave frequency energy.

3. The invention as defined by claim 1 and additionally including a timing circuit coupled to said RF generator means and said preparation means for synchronously applying a pulsed magnetic field to said spin echo sample in relation to the application of said first and said second pulse so that the first and second pulse occur at a predetermined time during the spin-lattice relaxation time of the sample resulting from the application of said pulsed magnetic field.

4. The invention as defined by claim 3 wherein said means for generating said pulsed magnetic field additionally comprises a pulse generator and magnetic coil means coupled together to said timing circuit means whereby said pulse generator means produces a current pulse for energizing said magnetic coil means.

5. The invention as defined by claim 4 wherein said RF generator means comprises microwave generator means for producing a first and a second pulse of microwave frequency energy and wherein said means for generating said static unidirectional magnetic field is also operated during the operation of said means for generating said pulsed magnetic field.

6. The invention as defined by claim 5 wherein the magnetic field of said preparation means comprises a pulsed magnetic field having an amplitude substantially greater than said static magnetic field.

7. The invention as defined by claim 3 wherein said RF generator means comprises a CW microwave frequency generator, and RF switch coupled to said CW microwave frequency generator, and a double pulse generator circuit coupled between said RF switch and said timing circuit for actuating said RF switch to produce said first and second pulse of RF energy.

8. The method of increasing the dynamic range and repetition rate of a spin echo signal comprising the steps of:
   generating a first unidirectional magnetic field of a predetermined strength and duration;
   positioning a spin echo sample within said first unidirectional field;
   applying a static unidirectional magnetic field in the same direction as said first magnetic field to said sample at least in the absence of said first magnetic field; and
   applying a first and a second pulse of RF energy to said sample substantially transverse to said static magnetic field after the termination of said first unidirectional magnetic field but within a predetermined time relative to the spin-relaxation time of the sample resulting from the termination of said first unidirectional magnetic field.

9. The method as defined by claim 8 wherein said step of generating said first unidirectional magnetic field further comprises generating a pulse of magnetic energy having substantially greater magnitude than the magnitude of said static magnetic field.

10. The method as defined by claim 9 and wherein said step of applying said static magnetic field additionally comprises applying said static magnitude concurrently with said first unidirectional magnetic field.